United States Patent [19]
Wood

[11] 3,974,998
[45] Aug. 17, 1976

[54] SPRAY COATING APPARATUS

[75] Inventor: Lee A. Wood, Feasterville, Pa.

[73] Assignee: Crown Cork & Seal Company, Inc., Philadelphia, Pa.

[22] Filed: July 9, 1974

[21] Appl. No.: 486,876

Related U.S. Application Data

[63] Continuation of Ser. No. 275,904, July 28, 1972, abandoned.

[52] U.S. Cl. ............................ 251/76; 251/129; 251/141; 137/594
[51] Int. Cl.² ....................................... F16K 31/10
[58] Field of Search ..................... 251/76, 129, 141

[56] References Cited
UNITED STATES PATENTS

| | | | |
|---|---|---|---|
| 2,222,419 | 11/1940 | McCarty | 251/76 X |
| 2,458,123 | 1/1949 | Wasserlein | 251/76 X |
| 2,557,514 | 6/1951 | Ray | 251/76 |
| 2,735,644 | 2/1956 | Bishofberger | 251/76 X |
| 3,366,288 | 1/1968 | Goldschein | 251/141 X |
| 3,473,780 | 10/1969 | Harms | 251/76 |
| 3,722,623 | 3/1973 | Waldecker | 251/76 X |
| 3,737,141 | 6/1973 | Zeuner | 251/129 |

FOREIGN PATENTS OR APPLICATIONS

| | | | |
|---|---|---|---|
| 1,072,725 | 3/1954 | France | 251/76 |
| 1,074,170 | 3/1954 | France | 251/76 |

*Primary Examiner*—Robert G. Nilson
*Attorney, Agent, or Firm*—Woodcock Washburn Kurtz & Mackiewicz

[57] ABSTRACT

Spray coating apparatus featuring an improved solenoid valve construction in which response time of the valve actuation is improved by a free-traveling armature. The armature which is unrestrained by spring or other means has an annular shoulder portion which is engageable with an enlarged head portion of the pilot member of the valve. When the pilot is in its seated position, the dimensions of the valve are such that the armature must travel a short distance before its shoulder will impact against the pilot head thus allowing kinetic energy to build up as the armature travel is initiated by coil energization which enables the armature to effectively snap open the pilot upon impact despite spring and high fluid pressure resistance. A response time on the order of 4 to 8 milliseconds is enabled by the elimination of mechanical characteristics in the valve which would otherwise tend to limit the drive characteristics of the circuitry and is further aided by the ratio of travel of armature to pilot between full opened and full closed position which enables the necessary kinetic energy build up in the armature for opening and permits the pilot to close independently of the return of the armature to its unactivated position.

12 Claims, 4 Drawing Figures

SPRAY COATING APPARATUS

This is a continuation of application Ser. No. 275,904, filed July 28, 1972, and now abandoned.

BACKGROUND OF THE INVENTION

1. Field of the Invention

The subject invention has wide application and may be used to advantage in any fluid control apparatus. It has particular utility where extremely high hydraulic pressures are used such as is the case in airless spraying systems where high fluid pressures and impinging fluid streams atomize the fluid in lieu of air. The use of the subject invention is particularly advantageous in can production facilities for spray painting and lacquering the insides of cans, where the spraying device must be able to instantaneously start and stop the spray as the individual cans pass through the spraying station necessitating extremely quick valve response capability.

2. Prior Art

The can making industry for years has been geared to air spray systems in which air is used to atomize the fluid. Many problems are associated with air systems and any such system necessarily must be dependent upon the available air supply. Compressed air supplies are affected by many factors such as temperature and humidity; and the pressure in plant supply lines can be easily caused to vary by these factors which will adversely affect the operation.

Many problems of air atomized spray methods may be eliminated by the use of an airless spray method, however, much higher fluid pressures then were necessary in the air systems are necessary to properly atomize the fluid. Standard solenoid valves where springs bear against armature and pilot which make it necessary that spring pressure as well as the high fluid pressure be overcome simultaneously upon coil energization have proven to be inadequate for spraying cans with coating materials. For use in the assembly line production of cans, it is desirable to have a response time for the valve to open upon coil energization on the order of 4 milliseconds. The standard solenoid valves as described cannot produce this quick reaction time to make such an airless system feasible.

The design of a quick response time valve for airless fluid atomizing systems is governed by a number of considerations which have not been developed in the past primarily because quick reaction spraying systems have been air atomization systems not involving the high fluid pressures which are necessary for airless systems. Valve mechanisms of the type disclosed by T. C. Knaebel et al in U.S. Pat. No. 2,965,350 which issued on Dec. 20, 1960 do not provide fast response times as needed for some application such as production line can spraying. The knaebel et al patent discloses a hermetically sealed valve mechanism that provides for a high flow rate by a double valve system in which a pilot valve 26 is opened by means of armature 30 as controlled by the energizing of magnetic coil 42, all of this which then allows main valve 16 to be opened by fluid pressure alone to provide the desired high rate of flow while sacrificing response time.

U.S. Pat. No. 3,473,780 which issued on Oct. 21, 1969 to G. E. Harms discloses a solenoid reaction jet actuator which opens for a time duration as controlled by the mechanical characteristics of the valve and is independent of the driver electronics. Such a design was deemed necessary for the use of jet actuators in spacecraft to eliminate weight and reliability problems of valves controlled by characteristics of the drive circuitry. The valve of the Harms patent while desirable in its limited application and related uses, lacks utility where it is necessary that the valve duration be adjustable and therefore dependent on the drive circuitry.

SUMMARY OF THE INVENTION

Accordingly, it is an object of the subject invention to provide a solenoid valve for a high pressure airless spray system which has a fast response time and may be actuated in the range of between 4 and 8 milliseconds.

It is another object of the subject invention to provide a solenoid valve which may be used for high pressure fluid spray systems so that air atomizing systems and their attendant problems may be eliminated.

It is still another object of the subject invention to provide a solenoid valve for a high pressure spraying system in which the valve is designed so that the armature may build up kinetic energy to provide the force necessary to overcome resistance and effectively impact against a portion of a pilot to unseat it from its closed position.

It is yet another object of the subject invention to provide a solenoid valve for a spraying system in which pressures in the range of 1250 psi must be used in a system in which there is a requirement for rapidly actuating and deactuating the spray.

Another object of the subject invention is to provide a solenoid valve having a free traveling armature in which only the optimum portions of the armature travel are used to open or close the valve.

It is a further object of the subject invention to provide a solenoid valve having a fast response time and of a precisely controlled duration of operation in which mechanical characteristics of the valve which adversely affect actuation and duration as provided by the drive characteristics of the circuitry are in large measure eliminated or reduced to a tolerable level.

It is still a further object of the subject invention to provide a solenoid valve having a free traveling armature in which the distance of travel of the armature is considerbly greater than the travel of the pilot as it is opened thus allowing kinetic energy to build up as the armature travels before impact with the pilot head and thus allowing the pilot to close by the force of a spring upon de-energization of the coil before the armature travels the full distance to its deactivated position thus providing a fast response valve.

It is yet a further object of the subject invention to provide a fast response solenoid valve in which a free traveling armature is aided in its return to its deactivated position by a combination of momentary spring biasing and gravity in which the armature is initially spring biased through the pilot toward its deactivated position upon de-energization of the coil, since a portion of the pilot bears against a portion of the armature when the pilot is in its fully open position; the armature simultaneously being urged to its deactivated position by gravity.

In accordance with the above objects a spraying system which utilizes an improved fast response, controlled duration solenoid valve is provided to enable a high pressure fluid spraying system to replace heretofore used air atomized spray systems. The subject invention provides a solenoid valve in which an armature which is unrestrained and free traveling is used in conjunction with a standard electromagnetic coil. The valve has a teflon seat and is closed by a pilot or plunger which is constructed with an enlarged head positioned at its upper end which is the opposite end from the seating portion. The pilot is biased to the closed position by a spring member acting between the top of the pilot head portion and an end portion of the surrounding sleeve assembly.

The armature has an annular shoulder portion which is designed to impact against the pilot head to raise the pilot from its seat. When the armature is in its deactivated position, a longitudinal space is present between the annular shoulder of the armature and the pilot head. As the armature is activated by the coil, it travels away from the valve seat with the armature shoulder passing through the space and impacting against the pilot head to release the pilot from the valve seat. Once the coil is de-energized the spring will bias the pilot back to its seated position and will also serve to force the armature back toward its resting position as the pilot head bears against the armature shoulder. The armature travels further then the pilot on its return to the deactivated position and backs against a pilot guide which is securely placed within the valve body creating the spacial relationship between the impact areas of the armature shoulder and pilot head as described above. This last part of the armature's return to its resting position is aided by gravity.

When the coil is energized, the build-up of kinetic energy during the initial movement of the armature as described above is sufficient to provide the momentum to snap the pilot from its seat. This energy is made effective since the armature does not have to initially overcome spring biasing as it starts up, thus enabling a much shorter response time than the standard solenoid valves when used in systems having heretofore prohibitive pressure ranges.

While the armature travels a moderate distance only the optimum portions of that travel actually open or close the valve. In the opening cycle the rate of travel of the armature is the greatest as it reaches the end of its travel and during that last portion of travel is when the armature impacts with the pilot to snap it open instantaneously, the entire opening response time being on the order of 4 to 8 milliseconds. During the closing cycle the armature moves the fastest initially when the coil is de-energized because the spring, which bears against the pilot and at this point in time affects the armature, is in its most compressed position thus exercising the most force momentarily after coil de-energization. The valve is closed quickly during the initial movement of the armature toward its resting position and once the valve is closed the armature will have sufficient time to return to its resting period since the critical part of the operation timewise has been completed.

The subject valve system may be used in a single spray line device or it may be used in a dual electric valve system which supplies two spray lines, each of which is completely independent and actuated by separate coils. In can production the two spray lines may be used for spraying both the inside bottom and the inside walls of a container. Likewise, the valve system may also be used with a series of sprayers in modified systems. Thus containers may be sprayed by means of a high pressure airless spray system which has a response time capability so as not to interfere with high volume can production to protect the contents of the containers.

DESCRIPTION OF PREFERRED EMBODIMENTS

Figure 1:
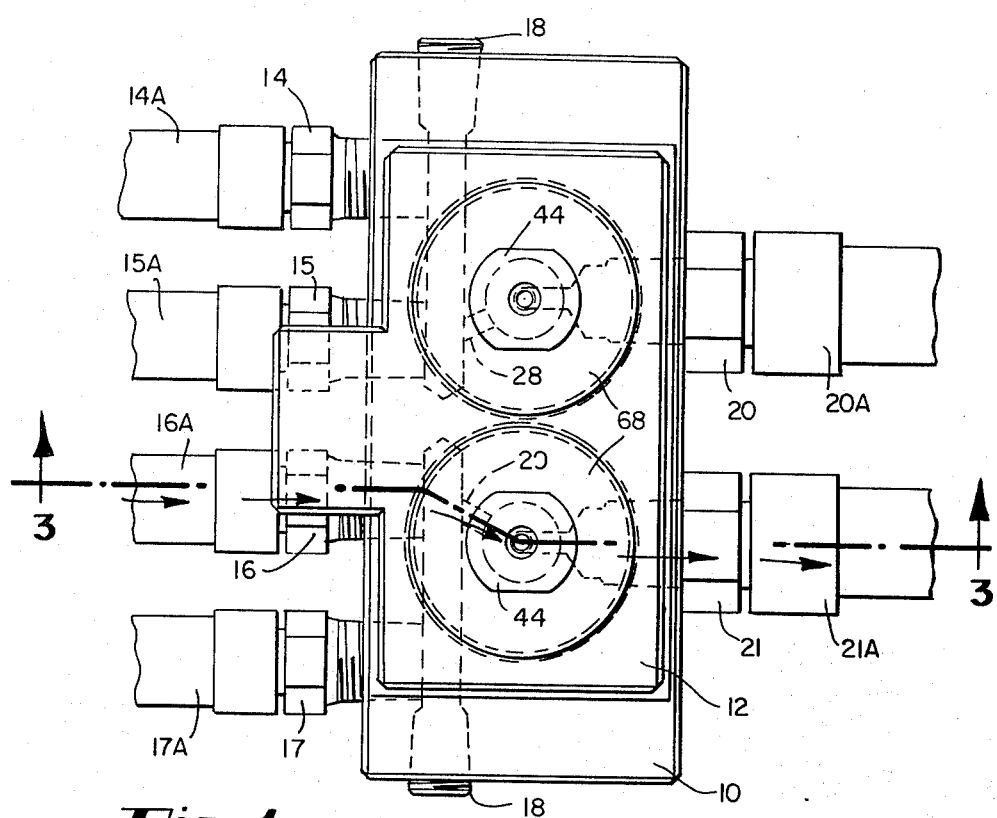
FIG. 1 is a top plan view showing a dual electric valve body in which two independent spray valve units are housed.
Figure 2:
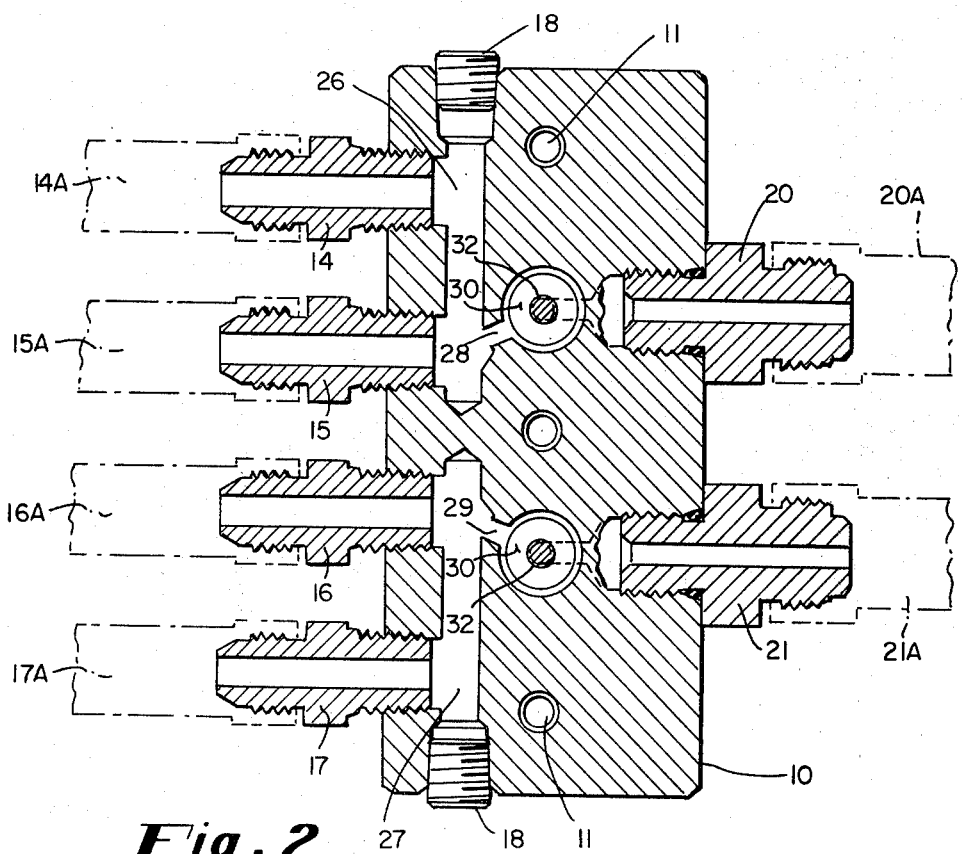
FIG. 2 is a sectional top view taken along the lines 2—2 of FIG. 3 showing the flow paths and valve base of the dual electric valve body.
Figure 3:
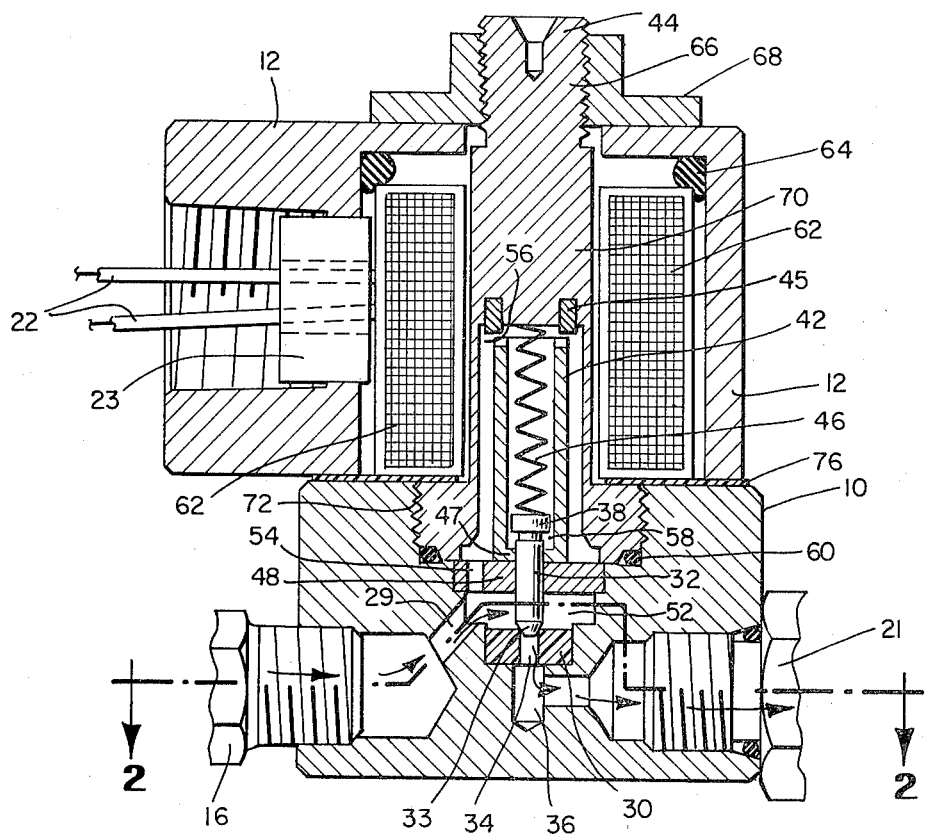
FIG. 3 is a sectional side view taken along the lines 3—3 of FIG. 2 showing the valve pilot of one of the independent valve units in the closed position.

With reference to FIGS. 1 and 2 a dual electric spray unit system for spray coating the inside of cans is shown having a valve body 10 which may be secured to spraying apparatus structure by means of threaded apertures 11. In some applications the valve body 10 must be secured in such a manner as to withstand continuing reciprocation as part of lancing type structure where nozzles are thrust in and out of each of the passing cans as the nozzle supporting structure reciprocates to permit the thrusting. An upper housing 12 is mounted on the top of body 10 as is best seen in FIG. 3 and together with the valve body 10, houses the internal parts of the spray actuation system. Each spray unit may have two independent spray lines which when connected to spray nozzles provide the capability of spraying the inner can walls from one line and the inner can bottom from the other line, each of the lines being independently actuable as will be hereinafter described.

It is to be clearly understood that the use of the dual unit is for example purposes only and a single unit or multiple units may be used in a variety of different types of spraying systems. The dual unit is described because the unit has found acceptance in can production techniques where two types of metals may be used for the manufacture of the cans as for example the use of steel for the body and aluminum for the ends necessitating different types of coatings.

Supply lines and connections 14, 15, 16 and 17 represent flow lines through which heated lacquer or other coating material for spraying is pumped from corresponding leaders 14A, 15A, 16A and 17A. Hot lacquer is continually circulated to each of the valve units with lines 15 and 16 representing inflow lines to each of the valve stations, while lines 14 and 17 represent outflow lines through which the lacquer returns to be reheated and recirculated. The system may be designed so that the inflow and outflow lines are reversible as will be assumed is the case for the system shown. Each of the two flow lines has a pressure relief valve 18, positioned on each side of the housing body 10 as shown. Output lines 20 and 21 flow through corresponding leaders 20A and 21A to each of the respective nozzles (not shown) for the spraying of the cans, one of which may be used to spray the inside can walls while the other sprays the inside can bottom.

The sectional view of FIG. 2 best shows the flow channels 26 and 27 within valve body 10 through which the coating material flows as it circulates through the system. Passageways 28 and 29 represent the entryways of the coating material into the valve units, the construction of which will shortly be described.

The purpose of the recirculation system is to provide means to heat those spray materials which need to be heated to maintain a constant viscosity. For spray materials where this is not necessary, such as water base compositions, the recirculation feature is not required and the outflowing lines 14 and 16 may be plugged. It should be understood that an unlimited variety of compositions may be used irrespective of whether recirculation is or is not needed as for example acrylic latex, vinyls, plastisols, organisols and epoxy compositions.

With reference to FIG. 3 one of the two valve units of the dual spray assembly is shown in a closed position. From incoming flow line 16 lacquer flows through passage 27 (see FIG. 2) and through entryway 29 into valve chamber 52 in the direction of the arrows. At the base of chamber 52 is a valve seat 30 which is preferably made of Teflon and which has an outlet orifice 34 extending therethrough. The outlet orifice 34 communicates with outlet chamber 36 through which the lacquer passes on its way to a spray nozzle (not shown) through the outgoing spray line designated by connector 21. The valve seat 30 is engaged by plunger or pilot 32 which seals off orifice 34 when the valve is in a closed position. The lower portion of pilot 32 is chamfered to allow the pilot to seat within a portion of the orifice 34. The upper portion of pilot 32 has a head portion 38 of greater diameter than the remaining portions of the pilot, which is engageable by the armature as will be described.

A disc-like pilot guide 48 rests on notches in the valve body 10 and steadies the pilot 32 which is inserted through an aperture in the center of the guide. The pilot guide effectively divides the chamber area into the lower chamber 52 and an upper cavity 56, which are fluidly connected by means of aperture 54 in the guide 48.

A free-floating unrestrained cylindrical armature 42 of magnetic material is positioned within the cavity 56 where the top of plunger 32 extends upwardly through guide 48. The cavity 56 in which armature 42 and plunger 32 are disposed is formed by the inner walls of sleeve assembly 44 which extends downwardly through coil housing 12 and is secured within valve body 10 in a manner which will be described. A spring member 46 is extendable between the top of head portion 38 of pilot 32 and the surface of the sleeve assembly which forms the top of cavity 56. The spring member 46 which acts to bias the plunger 32 to a closed position need not be secured at its top or bottom and is held loosely in place by the inner walls of armature 42. It will be seen that although the cylindrical armature 42 surrounds spring member 46, the armature is not restrained by the spring in any manner. The armature 42 has an inwardly disposed annular ring or shoulder portion 47 at its base which as can be seen is engageable with the pilot head 38 as the armature 42 is raised.

The armature 42 rests on pilot guide 48 upon which armature shoulder 47 abuts when the plunger 32 is in its closed position. The pilot guide 48 is secured firmly in place within the notch structure of valve body 10 by the base of sleeve assembly 44 which extends inwardly to overlap the outer circumference of the pilot guide 48. In the closed valve position as shown, the top of armature 42 does not bear against the sleeve assembly 44 and there is a vertical space or gap 58 between the armature shoulder 47 and the plunger head 38. As stated, spring member 46 does not restrain the armature 42 in any manner. The spring 46 does act to bias the plunger 38 to its closed position as shown in FIG. 3.

An electromagnet coil 62 is positioned around sleeve assembly 44 and is held in place by coil housing 12 when the coil housing is secured. A spacer O-ring 64 may be used to more firmly secure coil 62 in this position. Current is supplied to the coil for each unit by means of lead wires 22 which may enter the coil housing 12 through an entryway 24.

The sleeve assembly 44 contains three major integral parts; the top part is a threaded portion 66 about which flange nut 68 is threaded; the central portion 70, part of which is hollowed to form cavity 56 in which the armature 42, spring 46 and pilot head 38 are positioned; and the lower portion 72 which is threaded into receiving threads of the valve body 10. An O-ring 60 may be fitted between the bottom portion of sleeve assembly 44 and the valve body 10 as shown. Each of the valve units has its own assembly 44 and once each is threaded securely into body block 10, the coil housing 12 may be placed around the assemblies 44. For this purpose coil housing 12 may be a solid piece with two apertures through which the top of the sleeve assemblies 44 will extend as the coil housing is slipped into place. Flange nuts 68 for each of the assemblies can be threaded on the upper portion 66 of each sleeve assembly to secure the coil housing firmly in place. A gasket 76 serves as a seal between valve body 10 and the coil housing 12.

Sleeve assembly 44 has an annular groove in that portion of the assembly which forms the top of cavity 56 into which is placed a copper ring 45 which may be depressed or extend slightly below the assembly face. The ring 45 serves to steady the armature 42 during operation and reduce vibration and fluctuation of the armature.

As can be seen in FIG. 3 when the coil is not energized the armature 42 is in its resting position with its annular base 47 resting on pilot guide 48. The biasing effect of spring 46 and fluid pressure are holding pilot 32 in its closed position with chamfered end 33 inserted into orifice 34 and blocking the fluid flow therethrough. The vertical space 58 exists between armature base or shoulder 47 and the pilot head 38 and it will be seen that in this position the armature 42 is not restrained by either the pilot 32 or the spring 46, directly or indirectly.

Figure 4:
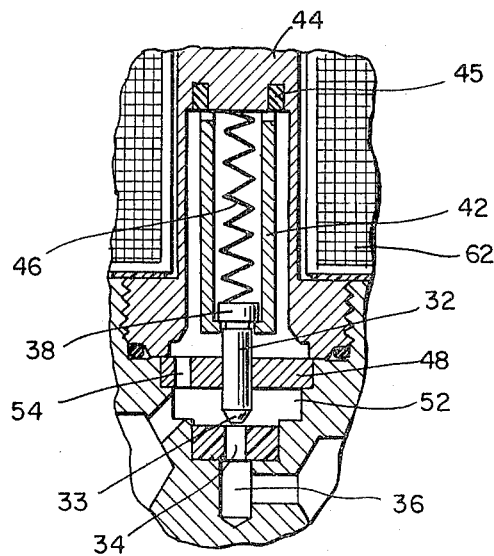
FIG. 4 is a cross-sectional fragmentary view identical with FIG. 2 except showing the valve pilot in its open position when the coil is energized.

With reference to FIG. 4 it will be seen that when coil 62 is energized, armature 42 is thrust upward from the pilot guide 48. It will be noted that the armature shoulder 47 portion must travel the distance of vertical space 58 before impacting with pilot head 38. During this time kinetic energy builds up momentum in the armature 42 and in a snap-like action forces the pilot 32 from the valve seat 30 as armature shoulder 47 impacts against pilot head 38. It is not until the armature shoulder 47 reaches the plunger shoulder 38 that the spring 46 acts as a restraint against the combination armature 42 and plunger 32 movement. This start time provides the plunger 32 and armature 42 with enough momentum to overcome the spring bias 46 and the very high pressure of the fluid within the system which may be in a range of 1250 psi. The annular copper ring 45 functions to reduce flutter and vibration in the armature as it reaches the sleeve assembly wall during its movement as described.

When the coil 62 is de-energized spring 46 and the fluid pressure force pilot 32 back to its seat and armature 42 is forced to its deactivated rest position as pilot head 38 bears against armature shoulder 47. This initial force and gravity cause the armature base shoulder portion 47 to reach the position shown in FIG. 3 with the armature shoulder 47 abutting pilot guide 48 after the pilot 32 is biased to its closed position.

In previous designs where a spring or biasing member bears directly against a portion of the armature, spring pressure as well as fluid pressure had to be overcome in the initial start-up. By the time a flux field was generated and had built up to such a strength that it could overcome the combination of the spring tension and the fluid pressure undue time would elapse making such a design impractical where time requirements are stringent and response time must be very fast. Such is the case in can production lines where the insides of cans had to be sprayed in some cases by a reciprocating nozzle which must be lanced within the can, the spray actuated, the spray deactuated and the nozzle withdrawn to enable the continued conveyance of the can, all in a fraction of a second.

In the subject invention the spray actuation time is greatly reduced since the armature 42 starts to travel as soon as there is enough strength in the flux field to start movement. By the time it rises to the point where the armature shoulder 47 contacts the plunger head the flux field is built up to its maximum strength and the armature is traveling at its maximum velocity and upon contact with the plunger head the plunger is snapped open.

In a preferred embodiment of the invention the components of the valve system have been designed so that there is approximately 10 times the distance of travel in the armature 42 as is in the pilot 32. While the pilot 32 travels 0.007 of an inch between its fully open and fully closed position, the armature 42 travels 0.075 of an inch between de-energized and energized positions. Thus as described above because of vertical space 58 which is 0.068 of an inch, the valve does not start to open when the armature 42 starts to travel upon energization of the coil 62, but opens in the last 0.007 of an inch or approximately 9.3 per cent of the armature's travel. When the coil is de-energized, the valve closes as the armature 42 moves its first 0.007 of an inch toward its de-energized rest position. At this point the armature 42 is only approximately one tenth of the way to its rest position but the valve has been closed and the armature travel is no longer of significance. In a can production line the steps between can sprayings will be occurring, such as in the case of lancing nozzles, the nozzle will be withdrawn from the sprayed can, a next can conveyed into spraying position, and the nozzle inserted into the next can to be sprayed. The above dimensions can be varied somewhat within reasonable limits but for best results the pilot travel should be held to less than 0.015 of an inch and should not exceed 11 per cent of armature travel.

It will be noted that in both opening and closing the valve, the optimum portions of travel of the armature 42 are used to actually open and close the pilot 32. In the open cycle, the rate of travel of the armature 42 is the greatest as it reaches the end of its travel and that last 0.007 of an inch of travel is the portion utilized to open the pilot. The pilot is snapped open on the order of 4 milliseconds. Total elapsed time from energizing the coil until the valve is open is on the order of 4 to 8 milliseconds. In the closing cycle movement is fastest initially because the spring is in its most compressed position and the pilot has the most force against it. The valve is closed in approximately 4 milliseconds after the coil is de-energized.

A number of factors contribute to these fast response times. When the coil is energized, the armature 42 in its resting position is not restrained by spring means but only gravity. Gravity and inertia must be overcome and the armature picks up velocity quite rapidly due to its length as is aided by using a long or tall coil. The flux field gets a good pull on the armature and there is no fluid pressure nor spring force to overcome until it has reached its maximum velocity which occurs in a minimum length of time. This is distinguished from past designs where pressure of the spring and fluid pressure holding the pilot down onto the seat had to be overcome from the stationary position. In such a situation the valve stays closed until sufficient force is built up in the flux field to finally break it open and the pull-out time is increased considerably.

The reverse is true in the closing cycle. If the pilot didn't contact the seat and fully close the valve until the armature had dropped all the way to its resting position, the closing time would be increased considerably.

Although a relatively long armature is used in the subject valve unit the length is not necessitated to provide a relatively long stroke of the pilot or plunger because as described above the pilot of the subject invention has a relatively short stroke. Rather the relative long length of the armature is required to help provide a fast response time as described above.

Thus the subject solenoid valve is controlled by the drive characteristics of the circuitry and mechanical characteristics of the valve that would tend to override the drive characteristics of the circuitry have been eliminated.

In a preferred design the orifice 34 in the Teflon seat has been made 0.0625 of an inch in diameter. The diameter at the tip of the chamfered pilot portion 33 is 0.050 of an inch. The pilot will thus enter the orifice because of the 0.0125 difference in diameter but it only enters to a depth of a few thousandths of an inch so that when the pilot is lifted, it is completely free of the orifice and does not obstruct the flow of coating material. Thus a high flow of material is achieved despite the short travel span of the pilot between closed and open position.

It is also advantageous to use a very light spring member 46 so that when armature 42 contacts the plunger head 38 there isn't a lot of spring pressure to overcome. This means that the high pressures on the order of 1250 psi are desirable to seal the orifice completely. To operate such a system in the range of from 80 to 100 psi a much larger orifice would be necessary to prevent leakage by allowing a deeper seating valve plunger.

Coil 62 may be a commonly available 115 volt 60 cycle 10 watt electromagnet coil. Since the entire unit will normally be placed on a reciprocating arm which will be reciprocating to cause the nozzle extension portion to move in and out of cans as they are sprayed, O-rings 64 are used to hold the coil 62 firmly within the housing 12 and prevent it from moving within the housing. The stroking may be as much as 130 times a minute over a range of from 5 to 6 inches.

The subject valve system may be used in the following manner in the dual valve system shown in FIGS. 1 and 2 which will independently feed two spraying nozzles. In spraying cans with steel bodies and aluminum ends, the body spray may be actuated first for a duration of 200 milliseconds. The end spray may be actuated approximately 70 milliseconds after the body spray actuation for a duration of 60 milliseconds. Any other timing sequence that is desirable may of course be employed with the machine speed being a factor. With the rapid valve actuation response time as provided by the subject invention approximately 145 cans a minute may be sprayed as described with protective coatings.

While various embodiments of the invention have been shown and described, it will be understood that various modifications may be made. The appended claims are therefore intended to define the true scope of the invention.

I claim:

1. A valve unit for use in assembly line spray apparatus requiring rapid actuation and deactuation comprising:
   a valve housing having fluid inlet means and fluid outlet means communicating with said inlet means and further having a cavity in fluid communication with said inlet means and said outlet means, said cavity including a cylindrical portion having a closed axial face, said face having an annular groove formed therein;
   a resilient valve seat within said valve housing having an orifice through which fluid may flow from said inlet means to said oulet means;
   a plunger aligned for and having a chamfered end disposed to close said valve seat orifice, said plunger having a head;
   a plunger guide for stabilizing said plunger within said valve housing;
   spring means extending between the area surrounded by said annular groove and the head of said plunger for biasing said plunger to a closed position to pressure seal the orifice of said valve seat;
   a copper ring disposed within said annular groove;
   electromagnetic coil means disposed within said valve housing; and
   an unrestrained magnetic armature free of spring biasing influence disposed within said valve housing cavity, said armature having an annular portion surrounding one end of said spring and terminating in an annular shoulder having a smaller inside and outside diameter than does said annular groove, and having a base portion which rests on said plunger guide when in an unactuated position and which is aligned to impact with said plunger head, there being a gap between said plunger head and said armature shoulder when said plunger is in a closed position such that upon energization of said coil, said armature base portion travels through the gap and impacts against said plunger head causing said plunger to overcome the fluid pressure and the bias of said spring to unseat and thereby open said orifice, said armature functioning without influencing lateral movement of said plunger, said armature seating upon said copper ring when in an actuated position.

2. The valve unit of claim 1 in which said plunger guide comprises a disc-like member, said plunger extending through a centrally located hole in said plunger guide.

3. The valve unit of claim 1 wherein the valve housing comprises a valve body, a sleeve assembly which in part forms said cylindrical cavity, and a coil housing member.

4. The valve unit of claim 3 wherein said sleeve assembly is threadably secured within a portion of said valve body, said sleeve assembly bearing against said plunger guide to secure it within said valve body.

5. The valve unit of claim 4 wherein said plunger guide has an aperture to permit the flow of fluid throughout the cavity.

6. The valve unit of claim 1 wherein the space between said plunger head and said armature shoulder when said valve is in closed position is on the order of substantially 70/1000ths of an inch.

7. The spray valve unit of claim 1 wherein the valve seat is made of Teflon and contains an orifice sized to receive said chamfered plunger to seat within said orifice.

8. The valve unit of claim 1 wherein said plunger extends into said orifice only a few thousandths of an inch.

9. The valve unit of claim 1 wherein said biasing means extends between said plunger and a portion of said housing yet not fixedly secured to either said plunger or said portion of said housing.

10. The valve unit of claim 1 wherein the length of the path of travel of said armature is approximately 10 times as great as the length of the path of travel of said plunger.

11. The valve unit of claim 1 wherein the response time for opening upon energization is between 4 and 8 milliseconds and the response time for closing said valve upon deenergization is approximately 4 milliseconds.

12. The valve unit of claim 1 operable in a fluid pressure range on the order of form 500 psi to 1250 psi.

* * * * *